(12) United States Patent
Toledano et al.

(10) Patent No.: US 7,626,610 B2
(45) Date of Patent: Dec. 1, 2009

(54) ELECTRONIC IMAGER TESTER

(75) Inventors: Eli Toledano, Haifa (IL); Ron Wittenberg, Haifa (IL)

(73) Assignee: Transchip Israel Ltd., Ramat Gan (IL)

( * ) Notice: Subject to any disclaimer, the term of this patent is extended or adjusted under 35 U.S.C. 154(b) by 720 days.

(21) Appl. No.: 10/988,194

(22) Filed: Nov. 12, 2004

(65) Prior Publication Data
US 2005/0128336 A1 Jun. 16, 2005

Related U.S. Application Data

(60) Provisional application No. 60/519,597, filed on Nov. 12, 2003.

(51) Int. Cl.
*H04N 17/00* (2006.01)
(52) U.S. Cl. .................. 348/187; 348/189; 348/190; 348/340; 348/345; 348/374
(58) Field of Classification Search .......... 348/187, 348/189, 190, 340, 374, 345; 53/317, 334; 81/452, 476, 486; 438/14–18; 493/471
See application file for complete search history.

(56) References Cited

U.S. PATENT DOCUMENTS

| | | | | |
|---|---|---|---|---|
| 3,812,742 A | * | 5/1974 | Polasek | 81/3.32 |
| 4,676,599 A | * | 6/1987 | Cruz | 359/829 |
| 5,115,617 A | * | 5/1992 | Lewis et al. | 53/306 |
| 5,165,310 A | * | 11/1992 | Heinrich | 81/120 |
| 5,613,168 A | * | 3/1997 | Kawano et al. | 396/146 |
| 7,158,170 B2 | * | 1/2007 | Gustavsson et al. | 348/187 |
| 7,379,113 B2 | * | 5/2008 | Kong et al. | 348/340 |
| 2004/0183936 A1 | * | 9/2004 | Kim et al. | 348/340 |
| 2005/0036057 A1 | * | 2/2005 | Ushirokawa et al. | 348/340 |
| 2006/0197862 A1 | * | 9/2006 | Lung | 348/335 |
| 2007/0165131 A1 | * | 7/2007 | Ish-Shalom et al. | 348/345 |

* cited by examiner

*Primary Examiner*—Lin Ye
*Assistant Examiner*—Chriss S Yoder, III
(74) *Attorney, Agent, or Firm*—Harness, Dickey & Pierce, P.L.C.

(57) ABSTRACT

According to the invention, an electronic module tester for engaging a camera module is disclosed. The electronic module tester includes a camera tester body, an engagement ring, and a camera back support. The engagement ring engages a lens holder of the camera module, where the engagement ring comprises an engagement surface, an outer circumference and an inner circumference. The engagement surface rotates and is not keyed for any key on the lens holder. The camera back support engages a back of the camera module, where the back is on the opposite side of camera module as the lens holder. The engagement ring and the camera back support are separated, but biased together to engage the camera module.

20 Claims, 8 Drawing Sheets

ELECTRONIC IMAGER TESTER

CROSS-REFERENCE TO RELATED APPLICATIONS

This application claims priority under 35 U.S.C. § 119 and/or 120 to U.S. Provisional Application Ser. No. 60/519,597 filed on Nov. 12, 2003.

BACKGROUND OF THE DISCLOSURE

This disclosure relates in general to electronic camera module testing and, more specifically, but not by way of limitation, to engagement of the camera to the test fixture.

Camera modules are tested by adjusting their focus by adjusting a lens holder which rotates in a tube or barrel. As the lens holder rotates, the lens moves with respect to the imaging array. The lens holder typically has notches, bumps or indentations that can be mated to a custom tool such that a test fixture can rotate the lens holder while the camera module is positioned to focus on a test pattern. For example, if the lens holder had four circular indentations, the customized tool would have four bumps to mate with the circular indentations. The lens holders are manufactured by various third parties and have a variety of different grips on the lens holder that would require a variety of mating tools.

BRIEF DESCRIPTION OF THE DRAWINGS

The present disclosure is described in conjunction with the appended figures.

In the appended figures, similar components and/or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION OF THE PREFERRED EMBODIMENT

The ensuing description provides preferred exemplary embodiment(s) only, and is not intended to limit the scope, applicability or configuration of the invention. Rather, the ensuing description of the preferred exemplary embodiment(s) will provide those skilled in the art with an enabling description for implementing a preferred exemplary embodiment of the invention. It being understood that various changes may be made in the function and arrangement of elements without departing from the spirit and scope of the invention as set forth in the appended claims.

Specific details are given in the following description to provide a thorough understanding of the embodiments. However, it will be understood by one of ordinary skill in the art that the embodiments maybe practiced without these specific details. For example, circuits may be shown in block diagrams in order not to obscure the embodiments in unnecessary detail. In other instances, well-known circuits, structures and techniques may be shown without unnecessary detail in order to avoid obscuring the embodiments.

Also, it is noted that the embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in the figure. A process may correspond to a method, a function, a procedure, a subroutine, a subprogram, etc. When a process corresponds to a function, its termination corresponds to a return of the function to the calling function or the main function.

Figure 1:
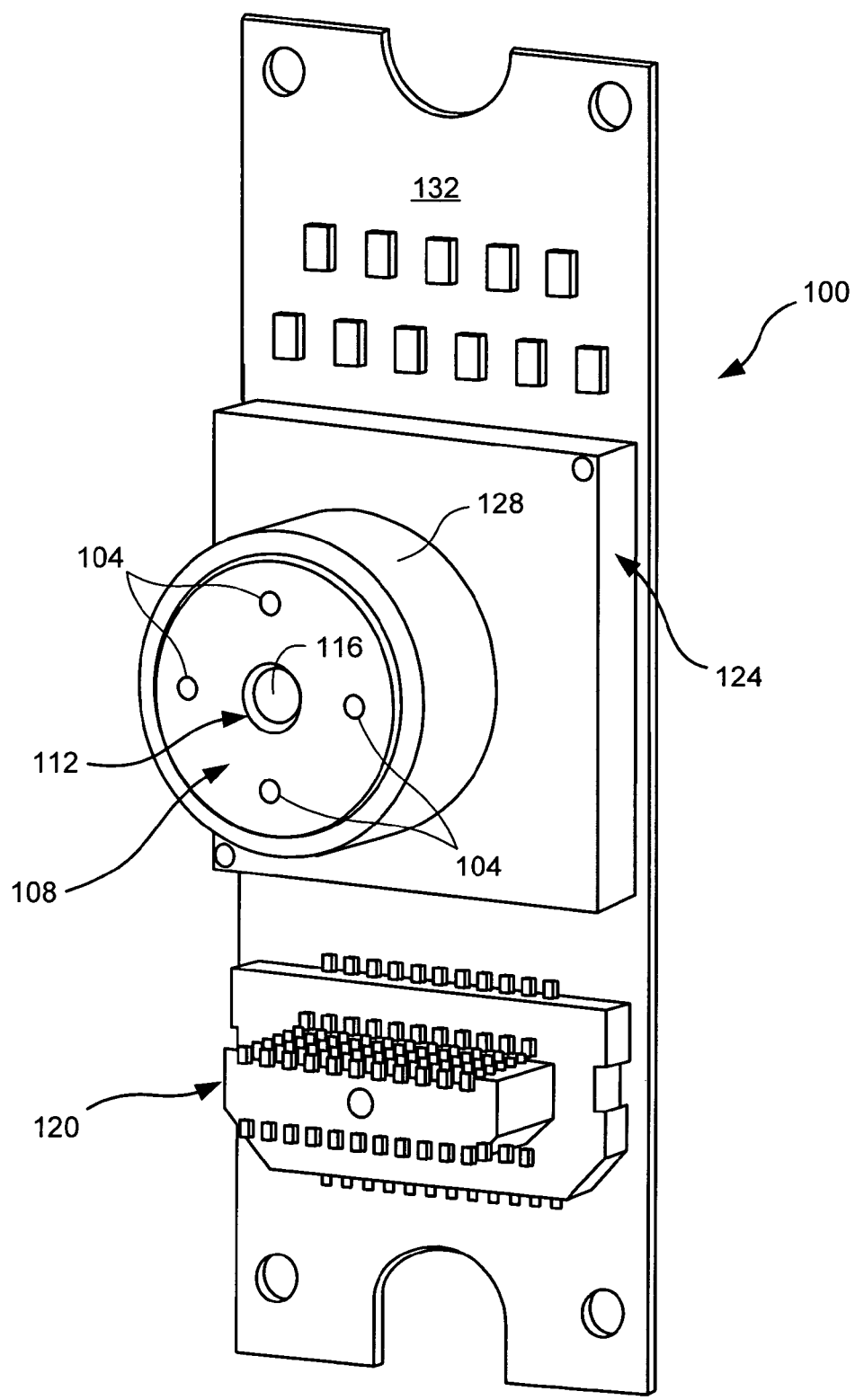
FIG. 1 is a diagram of an embodiment of a camera module.

Referring first to FIG. 1, a diagram of an embodiment of a camera module 100 is shown. Mounted on a printed circuit board 132 of the camera module 100 are a holder assembly 124, a connector 120, a miscellaneous other components. The holder assembly 124 includes a holder tube 128, a lens holder 108, and a lens 116. The lens holder 108 rotates with respect to the holder tube 128. The rotation moves the lens 116 closer or further from a imager to focus the imager. The lens holder has orientation holes or indentations 104 that can be mated to a tool that can be used to rotated to focus the imager. Different camera modules have different orientation holes 104 or other keying such that a custom tool for each configuration may be required.

Figure 2:
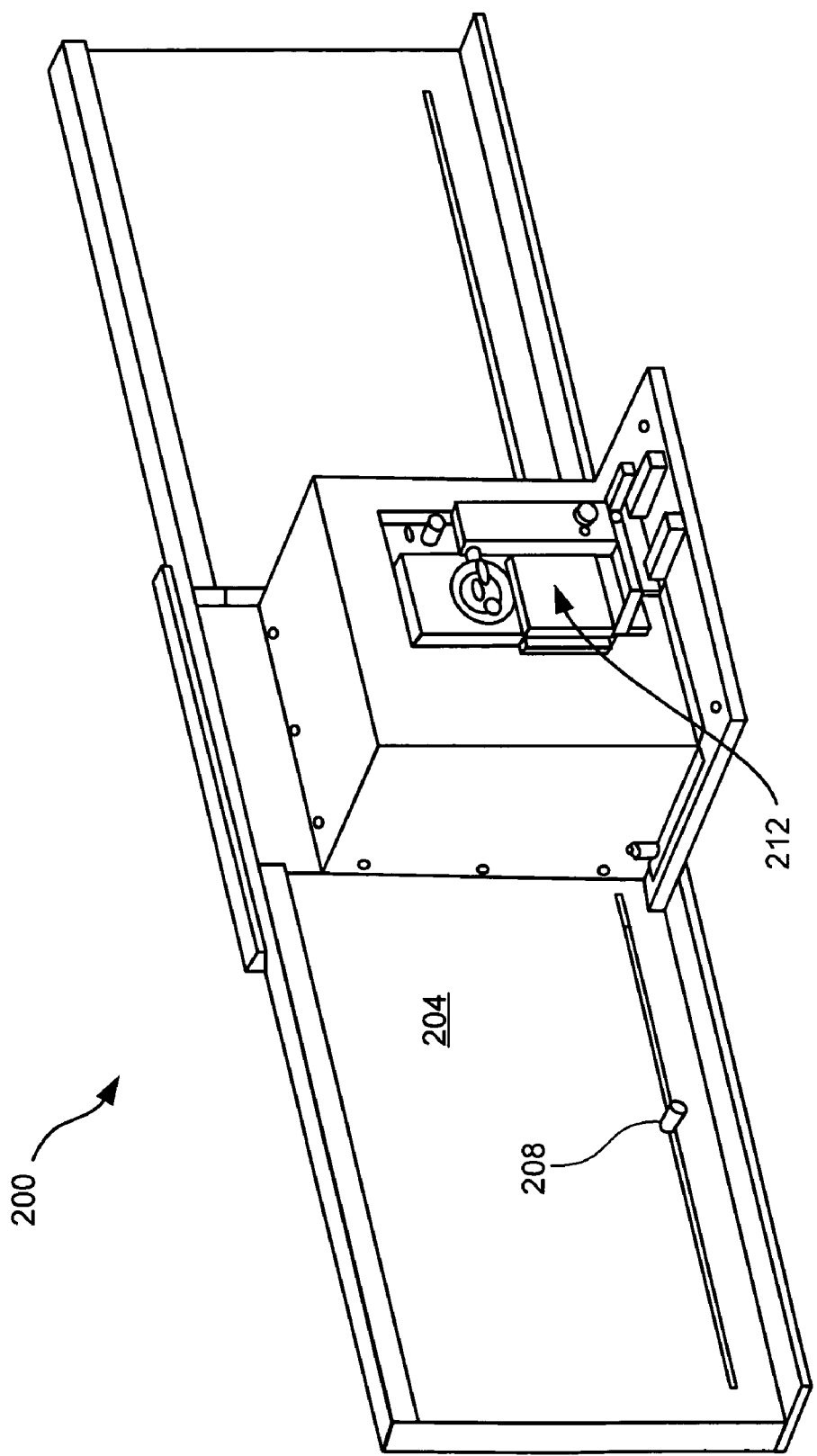
FIG. 2 is a diagram of an embodiment of a electronic imager tester.

With reference to FIG. 2, a diagram of an embodiment of a electronic imager tester 200 is shown. A slide target assembly 204 hold slides that can be moved in front of the camera module 100. The slides provide test scenes to focus upon when the lens 116 is being adjusted. A slide frame handle 208 is used to move slides in front of the camera module 100. A camera module stage 212 is where the camera module 100 is loaded during the test process. Camera modules 100 are inserted into the stage 212 one after another to adjust for proper focus. Once mounted in the stage 212, the camera module 100 can be moved with three degrees of freedom (i.e., yaw, roll and pitch).

Figure 3:
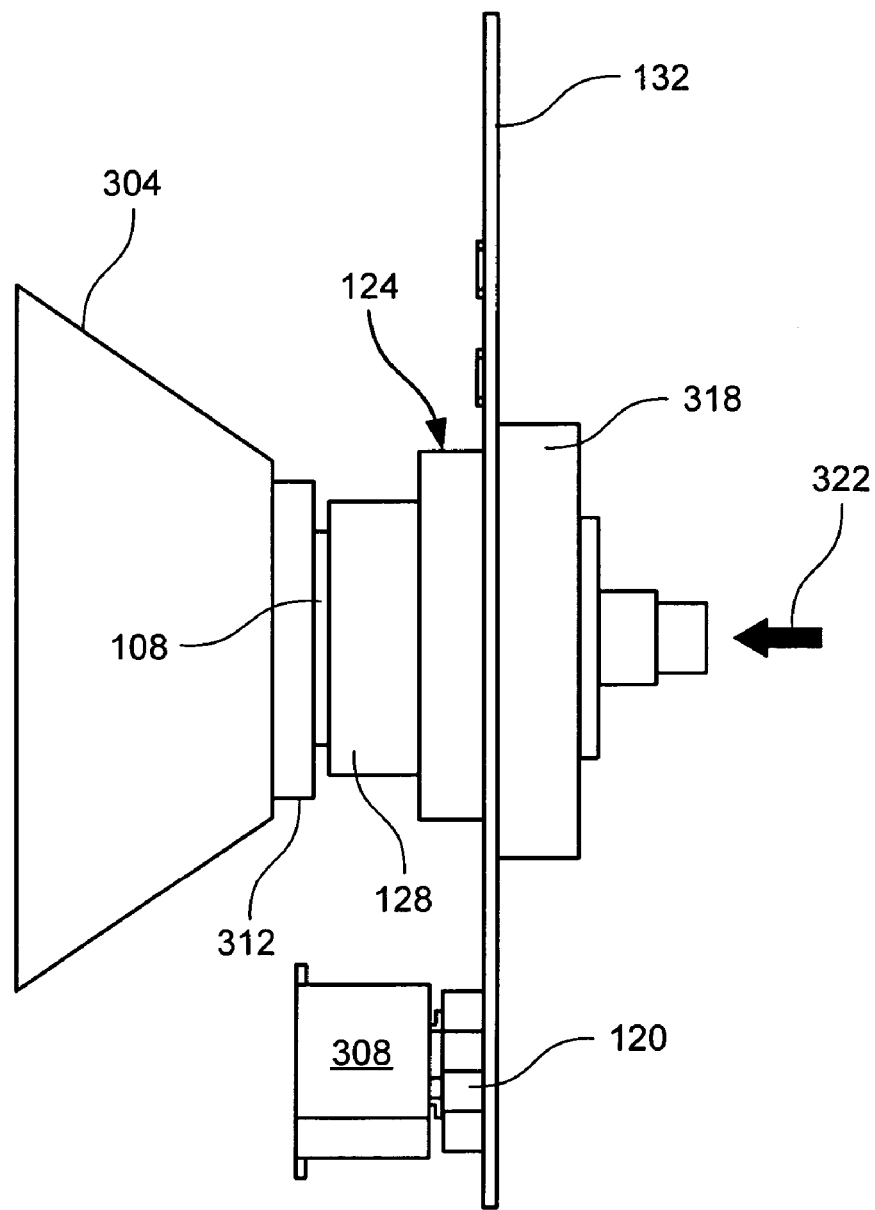
FIG. 3 is a side plan view of an embodiment of a portion of the electronic imager tester showing engagement of the camera module.

Referring next to FIG. 3, a side plan view of an embodiment of a portion of the electronic imager tester 200 that shows engagement of the camera module 100 is shown. An electrical connector 308 electrically couples the camera module to the imager tester 200. The connector 308 allows operating the camera module and reading the resulting images such that the operator and/or test software can test the camera module 100.

The camera module 100 is pinched between the lens holder 108 and the back of the printed circuit board 132, by an engagement ring 312 and a back support 318. A cone 304 made of aluminum, plastic or rubber has a shape that accommodates the field of view for the camera module 100 and is attached to the engagement ring 312 made of rubber or otherwise pliable in this embodiment. The attachment between the cone 304 and ring 312 can be permanent in one embodiment because the ring 312 does not have to be switched for different keying of the lens holder 108 for the various camera modules 100 that might be tested.

The cone 304 and engagement ring 312 are attached to a manual or motorized mechanism that causes rotation. When the engagement ring 312 is in contact with the lens holder 108 such that they are biased together, the rotation is transferred to the lens holder 108 to focus the lens 116. The equipment operator controls the rotation while viewing the output of the imager that is focused on the slide image. In some embodiments, the focusing is automated to be done without operator control.

The back of the printed circuit board 132 is in contact with the back support 318. The back support is supplied with a biasing or spring force 322. The biasing force 322 allows the engagement ring to friction grip the lens holder. Different engagement ring material and holder assembly 124 configurations may use different biasing force 322. By using a friction grip, any type of camera module 100 can be used without regard for engaging any keying (e.g., orientation holes) for a particular camera module 100. The engagement ring 312 and cone 304 are sized to accommodate a variety of lens diameters, lens holder diameters, and field of views.

In this embodiment, the biasing force 322 can be adjusted. With too much biasing force 322 the threaded engagement between the lens holder 108 and the tube holder 128 can cause the threaded engagement to bind or seize. Too little biasing force 322 and the engagement ring 312 may not friction grip the lens holder 108 or the whole camera module 100 might rotate with the engagement ring 312. Periodic calibration for a production run allows engaging many camera modules 100 without intervening adjustments.

In this embodiment, the biasing force 322 is applied by the back support 318 with the engagement ring 312 being fixed. Other embodiments could have the back support 318 being fixed with the engagement ring 312 and cone 304 being biased toward the back support 318.

Figure 4A:
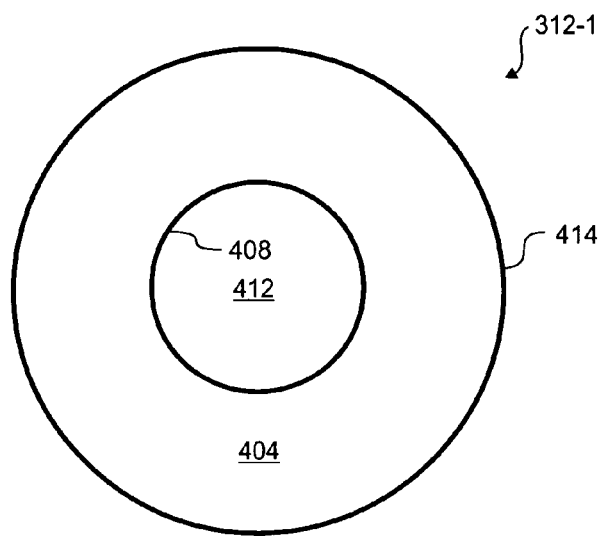
FIGS. 4A and 4B are top plan views of embodiment of an engagement ring.

With reference to FIG. 4A, a top plan view of an embodiment of an engagement ring 312-1 is shown. A surface 404 engages the lens holder. Notably, the surface 404 is not keyed for a particular lens holder 108 in this embodiment. The surface 404 could have texturing to enhance the friction grip ability. In this embodiment, the surface 404 is rubber, but could be cork, a polymer, or other material in other embodiments.

The engagement ring 312 is an annular ring shape in this embodiment. There is an internal circumference 408 that defines an aperture 412. The aperture 412 is sized to not obscure the field of view of the lens 116 and to accommodate some alignment tolerance between the engagement ring 312 and the camera module 100. Larger imagers could have larger lenses that require a larger aperture 412. An outer circumference 414 of the engagement ring 312 may or may not be larger than the distal circumference of the lens holder 108 in various embodiments. In one embodiment, the internal circumference 408 has a diameter of 4 mm or more, the outer circumference 414 has a diameter of 8 mm or more and a thickness of 1 mm or more.

Figure 4B:
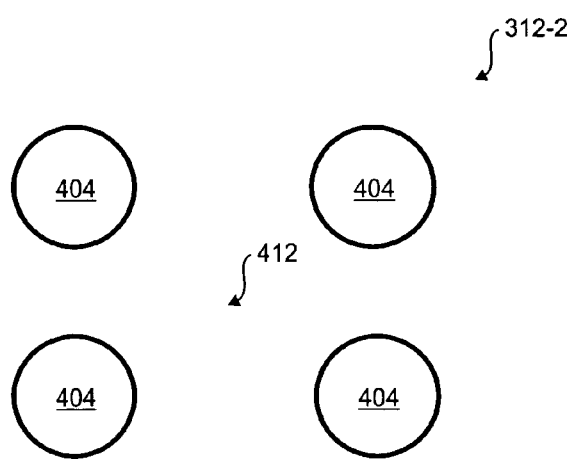

With reference to FIG. 4B, a top plan view of another embodiment of the engagement ring 312-2 is shown. In this embodiment, there are four pads that engage the lens holder 108 without obscuring the lens 116. Any arrangement of engagement surface(s) 404 could be used in various embodiments to establish a friction grip of the lens holder 108. In one embodiment, the engagement surface(s) 404 is keyed for a first set of orientation holes 104, but could be used with other camera modules 100 with different keying. The camera modules 100 with keying that doesn't match the engagement surface(s) 404 would rely upon a friction grip.

Figure 5:
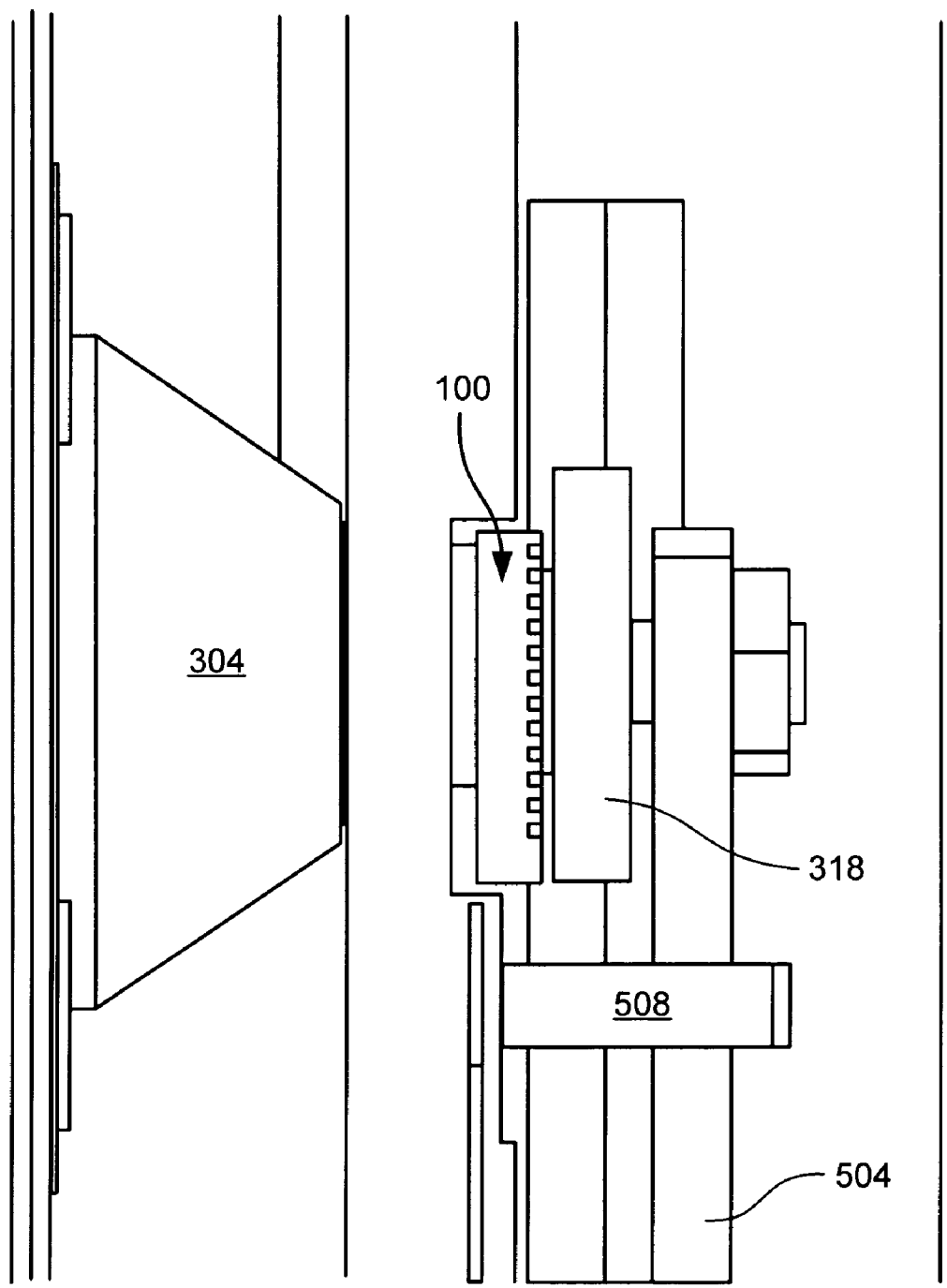
FIG. 5 is a top plan view of an embodiment of a portion of the electronic imager tester showing engagement of the camera module.

Referring next to FIG. 5, a top plan view of an embodiment of a portion of the electronic imager tester 200 is illustrated that shows engagement of the camera module 100. The camera module 100 is inserted before an support arm 504 is pulled away from a plane defined by the back of the camera module while rotating the support arm 504 to engage the back support 318 to the camera module 100. The rotation of the support arm 504 is limited by a stopper pin 508.

Figure 6:
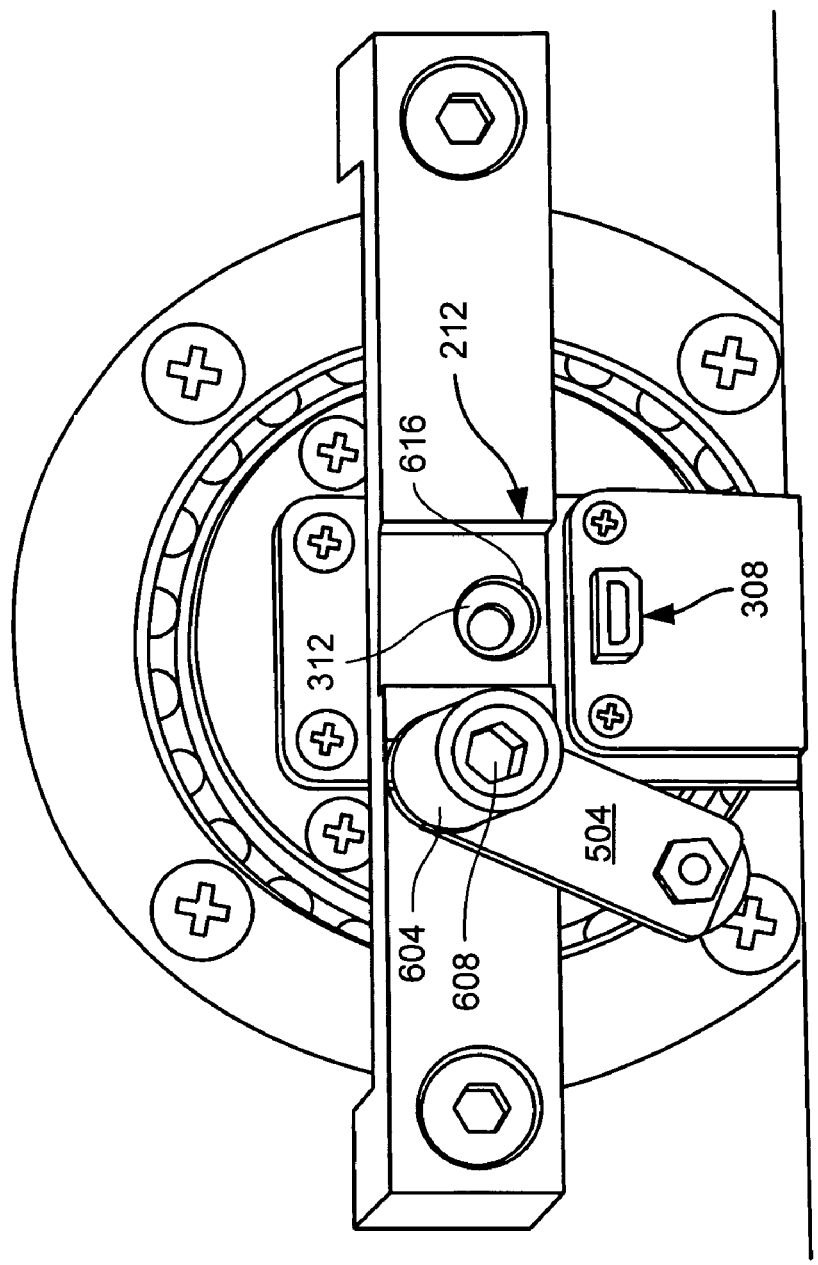
FIG. 6 is a diagram of an embodiment of a portion of the electronic imager tester showing where the camera module is loaded.

With reference to FIG. 6, a diagram of an embodiment of a portion of the electronic imager tester 200 is shown that illustrates where the camera module 100 is loaded. The camera module 100 is inserted into the staging area 212 such that the lens holder 108 engages the engagement ring 312. A guide tube 616 can be sized for the holder tube 128 to position the lens 116 with respect to the aperture 412 of the engagement ring 312. For holder tubes 128 of different diameter, the guide tube 616 could be sized accordingly.

In some embodiments, the guide tube 616 may be oversized to accommodate a variety of diameters for the holder tubes 128. If the aperture 412 obscures the image, the operator can reposition the camera module 100 until the field of view is clear.

This embodiment has a fixed connector 308 that engages the camera module 100 to provide electrical connectivity. In some embodiments, the connector 308 could be on a flexible connector to allow different placement of the mating connector 120 on the camera module 100. Further, some embodiments could have adapter cables to accommodate different connectors 120 on the camera module 100.

The support arm 504 rotates counter clockwise to engage the camera module 100. The biasing member 604 is located near the axis of rotation of the support arm 504. In this embodiment, the biasing member 604 is a elastic material such as rubber.

A spring force adjuster 608 can be rotated to increase or decrease the compression of the biasing member 604 to increase or decrease the spring force 322 of the back support 318. Once adjusted, the compression of the biasing member 604 does not change with normal operation of the support arm 504. Other embodiments could use a coil spring, a leaf spring, a motorized engagement force, a mechanical engagement force, or other means to engage the camera module 100. Although this embodiment has the spring mechanism at the axis of rotation of the support arm 504, other embodiments could locate the spring mechanism at the distal part of the support arm 504.

Figure 7:
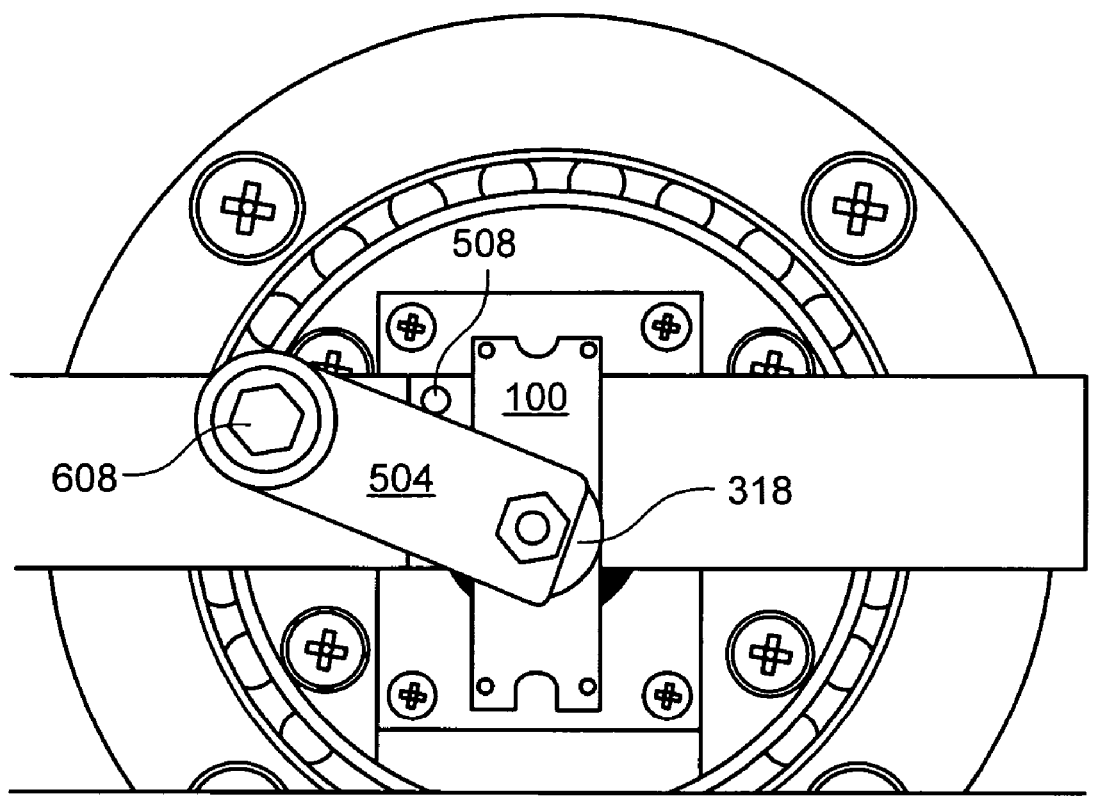
FIG. 7 is a diagram of an embodiment of a portion of the electronic imager tester showing the camera module biased in place.

Referring next to FIG. 7, a diagram of an embodiment of a portion of the electronic imager tester 200 is depicted that shows the camera module 100 biased in place. The support arm 504 has been rotated to the stopper pin 508. The operator fights the spring force 322 until the arm 504 hits the stopper 508 and then gently releases the arm 504 to engage the camera module 100.

Figure 8:
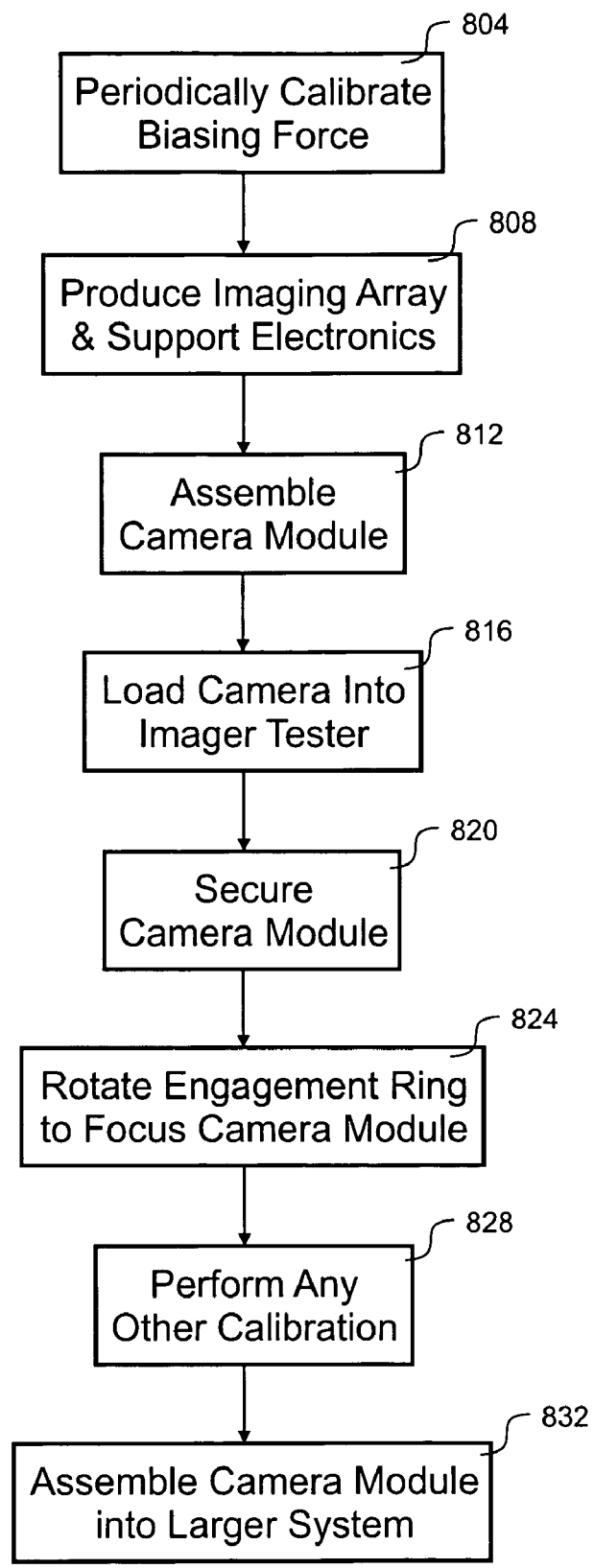
FIG. 8 is a flow diagram of an embodiment of a process for producing a camera with the electronic imager tester.

With reference to FIG. 8, a flow diagram of an embodiment of a process 800 for producing a camera with the electronic imager tester 200 is shown. The camera module could be embedded in a phone, web cam, surveillance camera, video camera, still camera or any other electronic device. The depicted portion of the process begins in step 804 where the biasing force 322 is periodically calibrated during a production run. A force meter can be applied to the back support 318 while the spring force adjuster 608 is manually adjusted. Some embodiments have an automated biasing force 322 that presses down on the camera module 100 until a predetermined force is measured.

In step 808, the imaging array and support electronics are produced or gathered. The imaging array or imager could be on a single chip with some support electronics or there could be multiple chips. The camera module 100 is assembled in step 812 with the circuit card 132, housing 124, etc.

During engineering or production testing, the camera module 100 is loaded into the imager tester 200 by orienting the module 100 and inserting the holder tube 128 into the guide tube 616. This embodiment adjusts the focus at the module stage, but other embodiments could adjust the focus after the camera module 100 is integrated into a larger assembly. In step 820, the support arm 504 is rotated and released to engage the back support 318 against the camera module 100.

A manual knob is coupled to the cone 304 to rotate the lens holder 108 while the operator views a readout or display to adjust focus of the camera module 100 in step 824. Other embodiments could have a motorized mechanism to rotate the cone 304. Some embodiments could use machine vision to determine when the lens 116 is focused. Any additional calibration is performed in step 828. The calibrated module 100 is ready for embedding in a larger assembly in step 832.

While the principles of the disclosure have been described above in connection with specific apparatuses and methods, it is to be clearly understood that this description is made only by way of example and not as limitation on the scope of the invention.

What is claimed is:

1. An electronic module tester for engaging a camera module, the electronic tester comprising:
    a camera tester body;
    an engagement ring that engages a lens holder of the camera module, wherein:
        the engagement ring comprises an engagement surface, an outer circumference and an inner circumference,
        the engagement surface is not keyed for any key on the lens holder, the lens holder comprises an outer edge and an inner edge, and the engagement surface rotates;
    a camera back support that engages a back of the camera module, wherein:
        the back is on the opposite side of camera module as the lens holder, and
        the engagement ring and the camera back support are separated, but biased together to engage the camera module.

2. The electronic module tester for engaging the camera module as recited in claim 1, further comprising a target image, wherein the camera module views the target image through the inner circumference.

3. The electronic module tester for engaging the camera module as recited in claim 1, wherein the biasing uses a spring.

4. The electronic module tester for engaging the camera module as recited in claim 1, further comprising a stopper assists in keeping the camera module from rotating.

5. The electronic module tester for engaging the camera module as recited in claim 1, wherein the biasing is sufficient to friction engage the lens holder such that rotation of the engagement surface rotates the lens holder.

6. The electronic module tester for engaging the camera module as recited in claim 1, wherein the biasing does not bind the lens holder such that it cannot rotate.

7. The electronic module tester for engaging the camera module as recited in claim 1, wherein the engagement ring is sized such that the inner circumference is large enough such that the field of view of the camera module is unobstructed.

8. A method for producing a camera module, the method comprising:
    assembling the camera module, which comprises a lens holder, a barrel and a back, wherein the back is generally opposite the lens holder and the lens holder rotates within the barrel;
    engaging the lens holder of the camera module with an engagement surface that is not keyed to mate any keying of the lens holder;
    engaging the back such that lens holder and back are biased together to hold the camera module without rotating;
    rotating the engagement surface, that is friction coupled to the lens holder, such that the lens holder rotates as does the engagement surface; and
    capturing an image while the lens holder is rotated to adjust focus for the camera module.

9. The method for producing the camera module as recited in claim 8, further comprising a step of adjusting engagement of the lens holder and back such that the friction coupling is sufficient to transfer the rotation of the engagement surface to the camera module.

10. The method for producing the camera module as recited in claim 8, wherein the engagement surface is sized to provide an aperture large enough to not obscure a field of view for the camera module.

11. The method for producing the camera module as recited in claim 8, further comprising a step of adjusting engagement of the lens holder and back such that the lens holder can move freely.

12. The method for producing the camera module as recited in claim 8, the engagement surface has a grip pattern that doesn't match any keying of the lens holder.

13. An electronic camera tester for engaging an electronic camera, the electronic camera tester comprising:
    a camera tester body; an engagement member that engages a lens holder of the electronic camera, wherein:
        the engagement member comprises an engagement surface, the engagement surface is not keyed for the lens holder, the lens holder comprises an outer edge and an inner edge, the engagement surface rotates;
    a camera back support that engages a back of the electronic camera, wherein:
        the back is on the opposite side of electronic camera as the lens holder, and
        the engagement member and the camera back support are separated, but biased together to engage the electronic camera.

14. The electronic camera tester for engaging the electronic camera as recited in claim 13, further comprising a target image, wherein the electronic camera views the target image through a cutout in the engagement member.

15. The electronic camera tester for engaging the electronic camera as recited in claim 13, wherein the biasing uses a spring.

16. The electronic camera tester for engaging the electronic camera as recited in claim 13, the engagement member is sized to have a first aperture larger than a second aperture of the lens holder.

17. The electronic camera tester for engaging the electronic camera as recited in claim 13, wherein the engagement surface is comprised of rubber.

18. The electronic camera tester for engaging the electronic camera as recited in claim 13, further comprising a stopper assists in keeping the electronic camera from rotating.

19. The electronic camera tester for engaging the electronic camera as recited in claim 13, wherein the biasing is sufficient to friction engage the lens holder such that rotation of the engagement surface rotates the lens holder.

20. The electronic camera tester for engaging the electronic camera as recited in claim 13, wherein the biasing does not bind the lens holder such that it cannot rotate.

* * * * *